United States Patent
Simhambhatla et al.

(10) Patent No.: US 6,246,459 B1
(45) Date of Patent: Jun. 12, 2001

(54) ASSEMBLY INCLUDING AN ACTIVE MATRIX LIQUID CRYSTAL DISPLAY MODULE AND HAVING PLURAL ENVIRONMENTAL SEALS

(75) Inventors: Murthy Simhambhatla, San Jose; David Barry, Los Gatos; Nils Wydler, Palo Alto, all of CA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/095,427

(22) Filed: Jun. 10, 1998

(51) Int. Cl.$^7$ .................. G02F 1/1333; G02F 1/1345
(52) U.S. Cl. .............................. 349/149; 349/58
(58) Field of Search .................. 349/149, 58, 60, 349/153; 361/681, 682; 345/905

(56) References Cited

U.S. PATENT DOCUMENTS

| | | | |
|---|---|---|---|
| 3,020,260 | 2/1962 | Nelson | 528/15 |
| 3,832,034 | 8/1974 | Edmonds | 349/44 |
| 4,435,047 | 3/1984 | Fergason | 349/86 |
| 4,600,261 | 7/1986 | Debbaut | 439/521 |
| 4,634,207 | 1/1987 | Debbaut | 339/116 C |
| 4,682,857 | 7/1987 | Tan | 399/199 |
| 4,685,771 | 8/1987 | West et al. | 349/94 |
| 4,722,384 | * 2/1988 | Matsutani | 163/5 |
| 4,777,063 | 10/1988 | Dubrow et al. | 427/503 |
| 4,832,781 | 5/1989 | Mears | 156/345 |

(List continued on next page.)

FOREIGN PATENT DOCUMENTS

| | | | |
|---|---|---|---|
| 0112417 | 7/1984 | (EP) | G02F/1/133 |
| 0294898 | 12/1988 | (EP) | H04N/9/31 |
| 0313053 | 4/1989 | (EP) | G02F/1/133 |
| 0361074 | 4/1990 | (EP) | G02F/1/133 |
| 0507639 | 10/1992 | (EP) | G02F/1/136 |
| 62-277789 | 12/1987 | (JP) | H05K/3/20 |
| 10-68935 | 3/1998 | (JP) | G02F/1/1333 |
| WO 95/25777 | 9/1995 | (WO) | C09K/19/54 |
| WO 96/05602 | 2/1996 | (WO) | H01B/3/46 |
| WO 96/19547 | 6/1996 | (WO) | C09K/19/54 |
| WO 96/20986 | 7/1996 | (WO) | C09K/19/54 |
| WO 98/00747 | 1/1998 | (WO) | G02B/27/02 |
| WO 98/11468 | 3/1998 | (WO) | G02F/1/133 |

OTHER PUBLICATIONS

Patent Abstracts of Japan, vol. 98, No. 008 (Jun. 30, 1998)(abstract of Hitachi Ltd., JP 10–68935.
Research Disclosure, "Reducing Temperaure Gradients in LCD's," No. 336, abstract n. 33660 (Apr. 1992).
Patent Abstract of Japan, vol. 014, No. 468 (P–1115)(Oct. 1990)(abstract of Casio computer, JP 02–186324 (1990)).
Garwin, IBM Techn. Discl. Bull. vol. 22, No. 8A, pp. 3447(Jan. 1980).
Huntley, IBM Techn. Bull. vol. 23, No. 1, pp. 347–348 (Jun. 1980).
Tummala et al., eds., "Microelectronics Packaging Handbook, Part II." p. 11–372 (Chapman and Hall, 1997).

Primary Examiner—William L. Sikes
Assistant Examiner—Dung Nguyen

(57) ABSTRACT

An active matrix liquid crystal display module (10) is contained in a base (20). Improved environmental sealing is provided by a primary seal (36) along the edge of the liquid crystal display module and a secondary seal (14a, 14b) at the base. The liquid crystal display module is affixed to a cover (12) which in turn is affixed to the base, such that the liquid crystal display module is suspended in a cavity (21) in the base, spaced apart from physical contact with the base. In this way, any thermomechanical stresses that may develop in the base are not transmitted to the liquid crystal display module. Thermal contact between the liquid crystal display module and the base is made via a thermally conductive material (19), to permit efficient heat dissipation.

17 Claims, 3 Drawing Sheets

U.S. PATENT DOCUMENTS

| | | | |
|---|---|---|---|
| 4,838,654 | 6/1989 | Hamaguchi et al. | 349/45 |
| 4,852,646 | 8/1989 | Dittmer et al. | 165/185 |
| 4,879,144 | 11/1989 | Nakura et al. | 428/1 |
| 4,910,579 | 3/1990 | Bowman et al. | 257/258 |
| 4,931,787 | 6/1990 | Shannon | 349/42 |
| 4,938,992 | 7/1990 | Mears | 427/578 |
| 4,992,201 | 2/1991 | Pealman | 252/299.1 |
| 4,997,606 | 3/1991 | Mears et al. | 264/102 |
| 5,005,951 | 4/1991 | Te Velde | 349/143 |
| 5,022,750 | 6/1991 | Flasck | 349/10 |
| 5,024,524 | 6/1991 | Flasck | 353/31 |
| 5,032,021 | 7/1991 | Kanatani et al. | 353/54 |
| 5,049,866 * | 9/1991 | Miyajima | 349/58 |
| 5,060,113 | 10/1991 | Jacobs | 361/721 |
| 5,060,114 | 10/1991 | Feinberg et al. | 361/706 |
| 5,079,300 | 1/1992 | Dubrow et al. | 525/106 |
| 5,108,172 | 4/1992 | Flasck | 353/31 |
| 5,160,879 * | 11/1992 | Tortola et al. | 320/111 |
| 5,170,194 | 12/1992 | Kurematsu et al. | 353/52 |
| 5,170,195 | 12/1992 | Akiyama et al. | 353/54 |
| 5,202,063 | 4/1993 | Andrews et al. | 264/4.6 |
| 5,233,445 | 8/1993 | Kamath et al. | 359/51 |
| 5,328,580 | 7/1994 | Reamey | 204/484 |
| 5,357,057 | 10/1994 | Debbaut | 174/76 |
| 5,405,551 | 4/1995 | Reamey et al. | 252/299.01 |
| 5,427,713 | 6/1995 | Wartenberg et al. | 252/299.5 |
| 5,504,605 | 4/1996 | Sakuma et al. | 349/58 |
| 5,514,906 | 5/1996 | Love et al. | 257/712 |
| 5,539,552 * | 7/1996 | Desai et al. | 349/58 |
| 5,543,944 | 8/1996 | Reamey et al. | 349/89 |
| 5,546,203 | 8/1996 | Takao | 349/62 |
| 5,625,372 | 4/1997 | Hildebrand et al. | 345/8 |
| 5,644,323 | 7/1997 | Hildebrand et al. | 345/8 |
| 5,748,269 | 5/1998 | Harris et al. | 349/58 |
| 5,818,564 | 10/1998 | Gray et al. | 349/161 |
| 5,880,795 | 3/1999 | Nagata et al. | 349/58 |

* cited by examiner

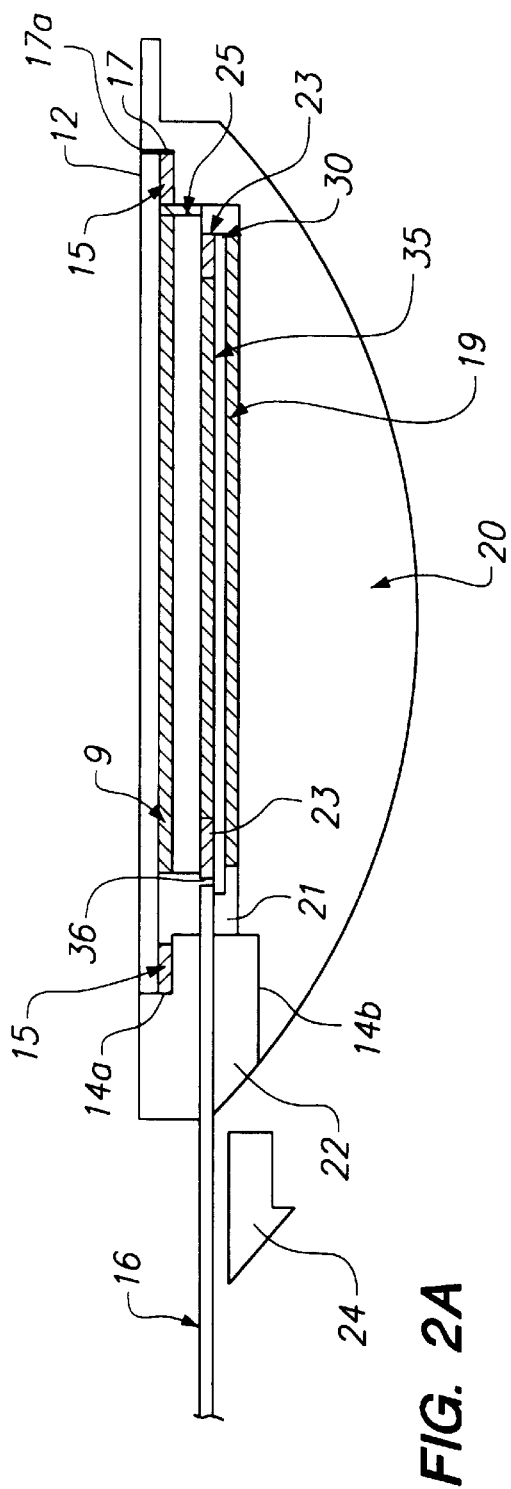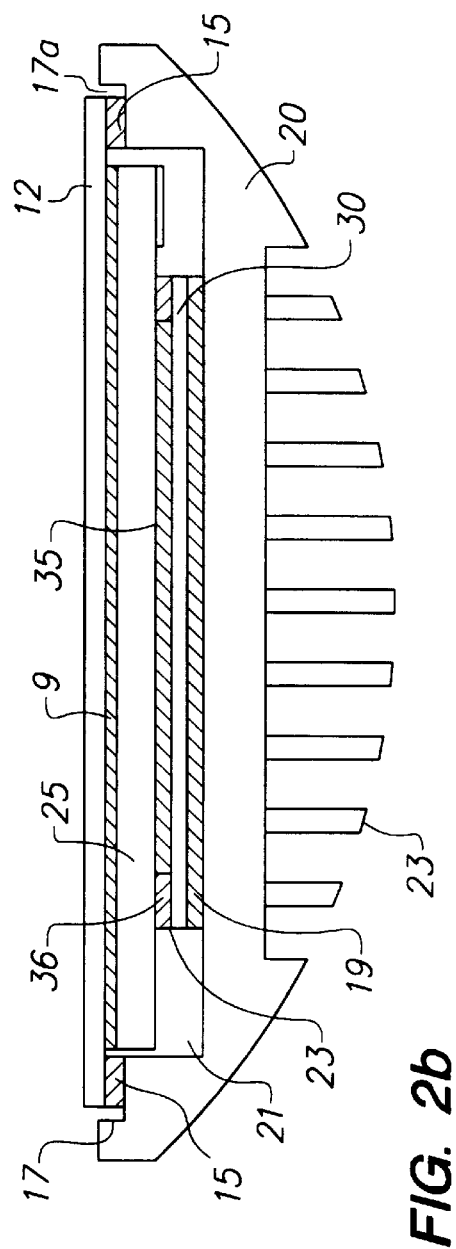

ASSEMBLY INCLUDING AN ACTIVE MATRIX LIQUID CRYSTAL DISPLAY MODULE AND HAVING PLURAL ENVIRONMENTAL SEALS

BACKGROUND OF THE INVENTION

1. Field of the Invention

This invention relates to an assembly having plural environmental seals for sealing an active matrix liquid crystal display module.

2. Description of Related Art

High resolution, high speed liquid crystal displays for depicting graphical or linguistic information comprise many pixels, each of which may be driven or controlled by an active matrix element such as a transistor. Illustrative publications relating to such displays include Edmonds, U.S. Pat. No. 3,832,034 (1974); Hamaguchi, U.S. Pat. No. 4,838,654 (1989); Bowman et la., U.S. Pat. No. 4,910,579 (1990); Shannon, U.S. Pat. No. 4,931,787 (1990); Te Velde, U.S. Pat. No. 5,005,951 (1991); Flasck, U.S. Pat. No. 5,022,750 (1991); Flasck, U.S. Pat. No. 5,024,524 (1991); Flasck, U.S. Pat. No. 5,108,172 (1992); Kamath et al., U.S. Pat. No. 5,233,445 (1993); IBM, EP 0,112,417 (1984); N. V. Philips, EP 0,294,898 (1988); Garwin, IBM Technical Disclosure Bulletin, Vol. 22, no. 8A, pp. 3447–8 (January. 1980); and Huntley, IBM Technical Disclosure Bulletin, Vol. 23, no. 1, pp. 347–8 (June. 1980).

The active matrix elements are disposed in an array, each element helping define a pixel and controlling the visual state of liquid crystal material associated therewith. Depending on the desired switching state of an active matrix element, a voltage (electric field) is applied or not to the liquid crystal material. In turn, the liquid crystal material is switched from one electro-optical state to another. For example, a pixel in the "field-on" state may permit incident light to be transmitted through the liquid crystal material and to be specularly reflected by a reflector positioned behind it, back towards the incidence side (albeit angularly displaced by operation of the laws of reflection), while a pixel in the "field-off" state may prevent such reflection by scattering or absorbing the light. The combination of many "on" and "off" pixels generates an image which can be viewed directly, or projected onto a screen for viewing, or viewed as a virtual image with the aid of appropriate optics. By combining red, green and blue images, either via sequential illumination with red, green and blue light or via dedicated red, green and blue pixels, a colored image can be formed.

One type of liquid crystal material that may be used is a liquid crystal composite comprising plural volumes or droplets of liquid crystals are contained within a polymer matrix, such as disclosed in Fergason, U.S. Pat. No. 4,437,047 (1984).

The operation of such displays generates heat which must be dissipated. The heat can arise from the absorption of light incident from a light source (which is especially intense for projection displays) and/or electrical power consumption by the active matrix elements. A conventional way to dissipate heat is to adhesively bond the backside of a substrate containing the active matrix elements to a heat sink, such as a block of metal. However, as the local temperature fluctuates during the course of operation of the display, thermally induced mechanical stresses can develop in the substrate due to differences between its and the heat sink's coefficients of thermal expansion. The stresses can propagate to the liquid crystal material itself, which is confined between the backside substrate and a front-side substrate. Liquid crystal materials may be sensitive to such stresses and may have their electro-optical properties adversely affected. A solution to this problem is disclosed in copending, commonly assigned U.S. patent application of Gray et al., Ser. No. 08/713,909, filed Sep. 13, 1996 (hereinafter the "Gray application"), the disclosure of which is incorporated herein by reference. The Gray application discloses an assembly for dissipating heat from an active matrix liquid crystal display module while avoiding developing thermally induced mechanical stresses. The module is affixed to a circuit board containing electrical leads for connection to drive electronics, in a way such that the substrate containing the active matrix elements is suspended through a window or through-hole in the circuit board and is sunken or nested into a soft elastomeric gel which is electrically non-conductive but thermally conductive. The gel provides the requisite thermal conductivity to dissipate the heat via a heat sink with which the gel is in thermal contact.

Another important performance parameter is effectiveness of the seal isolating the liquid crystal material from the external environment. In a typical design, the liquid crystal material is sandwiched between a top and a bottom substrate, such as glass, polymer or a semiconductor. The edges of the sandwich are sealed by an edge sealant. The assembly in the Gray application follows this design. However, it is possible for environmental agents— especially moisture—to find their way across the edge sealant, contaminating the liquid crystal material and adversely impacting its electro-optical properties. By way of a specific illustration, for liquid crystal composites, the voltage holding ratio (VHR) is lowered if moisture ingress occurs. The liquid crystal material acts as a capacitor, storing charge for approximately 16 msec between frame refreshes when the pixel capacitors are re-charged. A reduced VHR results in increased charge leakage across the liquid crystal material between frame refreshes, thereby reducing the amount of light transmitted between frame refreshes.

BRIEF SUMMARY OF THE INVENTION

The present invention provides an assembly including an active matrix liquid crystal display module, having the advantageous characteristics of heat dissipation, avoidance of mechanical stresses, and improved environmental sealing. Briefly, an assembly of this invention provides improved environmental sealing for the liquid crystal material in liquid crystal display modules by having plural seals: a first, or primary, seal at the module itself and a second, or secondary, seal sealing the module within the assembly. Accordingly, there is provided an assembly comprising (a) a base having a cavity and a lateral opening;
(b) a liquid crystal display module, including
   (i) first and second substrates oriented in a generally face-to-face relationship, wherein the first substrate is transparent and has on its interior face a transparent electrode material and wherein the second substrate has on its interior face a plurality of active matrix elements;
   (ii) liquid crystal material sandwiched between the first and second substrates; and
   (iii) an edge sealant forming a seal around the edges of the liquid crystal display module;
(c) a transparent cover;
(d) a cover sealant bonding the transparent cover to the base such that the cover covers the cavity and a seal is formed between the cover and the base;
(e) an adhesive bonding the first substrate of the liquid crystal module to the transparent cover, such that the liquid crystal display module is suspended in the cavity but is spaced apart from direct physical contact with the base;

(f) a thermally conductive material thermally connecting the liquid crystal display module and the base;

(g) external connect circuitry connected to and extending from the liquid crystal display module and exiting the base through the lateral opening; and (h) an insert fitting into and sealing the lateral opening while permitting the external connect circuitry to exit therethrough.

BRIEF DESCRIPTION OF THE DRAWING(S)

FIG. 1 is a plan view of an assembly according to this invention.

FIGS. 2a and 2b are cross-section views of the assembly, taken along orthogonal lines 2–2' and 3–3', respectively, of FIG. 1.

Numerals repeated herein from one figure to another denote the same or similar elements.

DETAILED DESCRIPTION OF THE INVENTION

Figure 1:
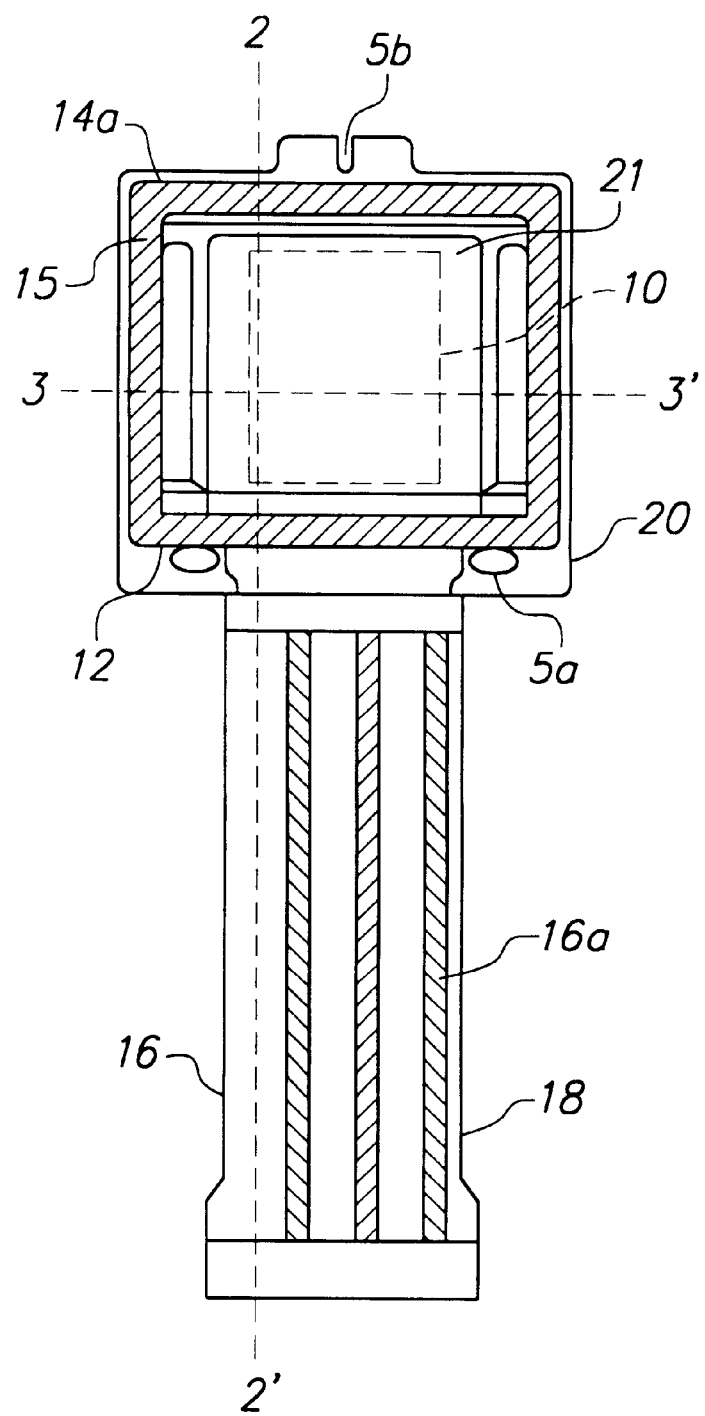

The assembly of this invention can be appreciated by reference to the figures, starting with FIG. 1, a plan view showing an assembly 1 in which a liquid crystal display module 10 is adhesively bonded to a cover 12, made preferably of glass but permissibly of some other rigid transparent material such as quartz, polycarbonate or an acrylate or methacrylate polymer or copolymer. Base 20 contains a cavity 21 in relation to which module 10 is suspended, or sunken. The combination of module 10 and cover 12 rests on base 20 supported along the edges of cover 12, which is larger than module 10. Cavity 21 is covered by cover 12, and a cover seal 14a is formed between cover 12 and base 20 by a cover sealant 15, such as an adhesive bonding the two together. External connect circuitry 16 serves to connect module 10 to external drive electronics that control the image displayed by module 10 and comprises leads 16a and support 18. Support 18 preferably is a flexible material such as polyimide or a fluoropolymer, forming what is known in the art as a "tail," or of a substantially rigid material, as in a printed circuit board. External connect circuitry 16 exits base 20 via a lateral opening in base 20 (not visible in the view of FIG. 1). Closed slots 5a and open slot 5b are for receiving pins, screws, or other alignment or securing means for precise positioning and/or fastening of the assembly to the rest of the display. External circuitry 16 and module 10 may be bonded and electrically connected to each other via respective pads (not shown) using an anisotropically conducting film, a type of adhesive film that conducts in the "z" direction but not in the "x" or "y" directions, thus permitting electrical contact between corresponding pads without shorting adjacent pads.

Referring now to FIG. 2a, which is a cross-sectional view along line 2–2' of FIG. 1, module 10 is seen to comprise a first (or front) substrate 25 and a second (or rear) substrate 30, oriented in a generally face-to-face relationship and sandwiching therebetween a liquid crystal material 35. First substrate 25 is made of a relatively rigid transparent material such as glass and carries on its interior face (i.e., the one facing second substrate 30) a thin layer of a transparent electrode material 27 (not shown in FIG. 2a; see FIG. 3, infra), such as indium tin oxide (ITO) or a thin metal coating, which serves as a ground plane electrode for module 10. Second substrate 30 carries on its interior face a plurality of active matrix elements 31 (not shown in FIG. 2a; see FIG. 3, infra). Electrode material 27 and switching elements 31 face inwards, i.e., towards liquid crystal material 35. An edge sealant 23 may be used to keep liquid crystal material 35 in place and to environmentally protect it, thus forming the first, or primary, seal 36. Module 10 is affixed to cover 12 by refractive index matched adhesive 9, which bonds cover 12 and first substrate 25. Index matched adhesive 9 may be a low modulus epoxy or another adhesive with similar low modulus, to minimize the transmission of thermo-mechanical stresses to module 10.

Cover sealant 15 bonds cover 12 along its edges to base 20, with a bond line preferably at least 2 mm wide, such that cover 12 covers cavity 21. Preferably, base 20 has a depression 17, which assists the precise positioning of cover 12 and protects it from dislocation or damage by a side impact. Note is made of a gap 17a between the edge of cover 12 and base 20, to accommodate different rates of thermal expansion where the two have different coefficients of thermal expansion. Module 10 is thus suspended in cavity 21, spaced apart from direct physical contact therewith and avoiding the transmission thereto of mechanical stresses, thermally induced or otherwise, that may develop in base 20. Heat dissipation from module 10 is provided by a thermally conductive material 19 (preferably an elastomer, especially a soft material such as a gel), making thermal contact between module 10 and base 20. Because of its low modulus of elasticity, material 19 is able to maintain thermal contact without transmitting mechanical stresses to module 10.

External connect circuitry 16 exits base 20 via lateral opening 22. An insert 24, such as a plug or wedge, forms a lateral seal 14b in lateral opening 22, while permitting external connect circuitry 16 to exit therethrough. Insert 24 preferably is made of the same material as base 20, to avoid thermo-mechanical stresses due to differing coefficients of thermal expansion. A wedge shaped insert can be conveniently pressed into place, providing strain relief for external connect circuitry 16. A lateral sealant may be used to form a seal among insert 24, external connect circuitry 16, and lateral opening 22. The lateral sealant may, but need not be, the same material as cover sealant 15. In the embodiment depicted, insert 24 presses the tail against the walls of lateral opening 22. Alternative designs, in which for example insert 24 contains an opening through which the tail passes, are permissible. Insert 24 may, in alternative embodiments, be made of an elastomeric material that is either pre-made in a desired size and shape, or is placed in lateral opening 22 in an unsolidified or uncured state and then is solidified or cured in situ, e.g., by cooling or a chemical crosslinking reaction, thus sealing at lateral opening 22 without the need for a lateral sealant. Or, insert 24 may be configured to fit tightly with external connect circuitry 10 and lateral opening 22, to form an interference or gasket-type seal.

Turning now to FIG. 2b, which is a cross-sectional view along line 3–3' of FIG. 1, one feature visible in this view but not in that of FIG. 2a are optional fins 23 in base 20, to increase the efficiency of heat dissipation by radiation.

Cover seal 14a and lateral seal 14b in combination form a second, or secondary, seal hermetically containing module 10 inside cavity 21 of base 20 and isolating it from the external environment. Having a primary seal at module 10 and a secondary seal 14a, 14b at base 20 provides improved sealing compared to prior art constructions in which only one seal (e.g., the primary seal) is present. In this manner, the chance of deterioration of electro-optical properties due to contamination (especially by moisture) of the liquid crystal material is minimized. It is to be understood that the reference herein to one seal as the "first" or "primary" seal and the other as the "second" or "secondary" seal refers to their relative proximities to liquid crystal material 35. No inference should be drawn that the "primary" seal is necessarily more efficacious than the "secondary" seal (or vice-versa).

Figure 3:
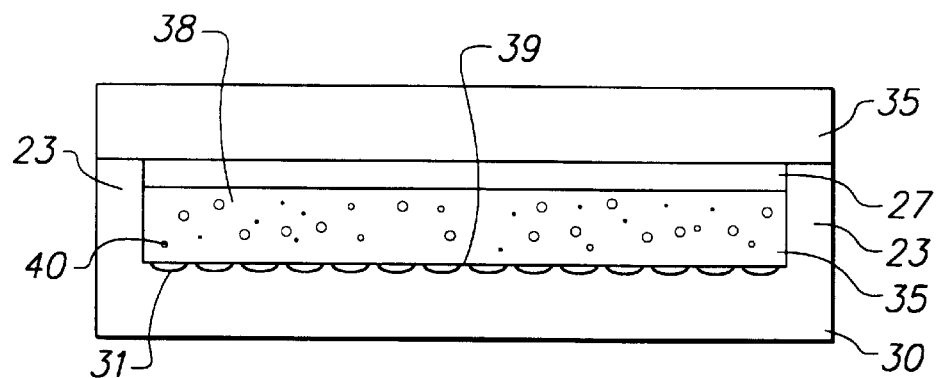
FIG. 3 is a detailed cross-sectional view of a liquid crystal display module for use in the assembly of this invention.

A more detailed view of module 10 is presented in FIG. 3. Switching elements 31 control the application or not of an electric field across the portion of liquid crystal material 35 which is immediately adjacent thereto and hence its electro-optical state, thus defining a pixel. Liquid crystal material 35 is depicted in the preferred embodiment in which it comprises a liquid crystal composite in which plural volumes 40 of liquid crystals are contained in a polymer matrix 38. Second substrate 30 also includes a reflector means 39 for reflecting light transmitted through liquid crystal material 35, so that the image formed thereon can be viewed, either directly or after projection onto a screen. Reflector means 39 can be the surface of second substrate 30 itself, polished smooth, or it may be a separate reflector element.

Figure 4A:
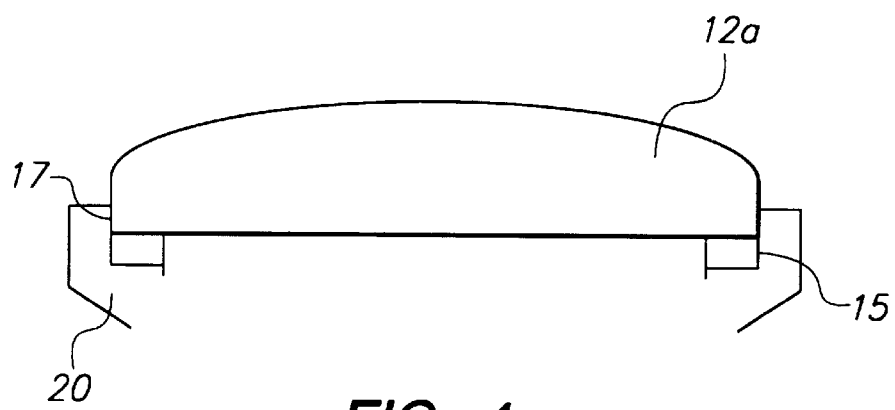
FIGS. 4a and 4b depict alternative embodiment in which the assembly is integrated with optical elements for the display.
Figure 4B:
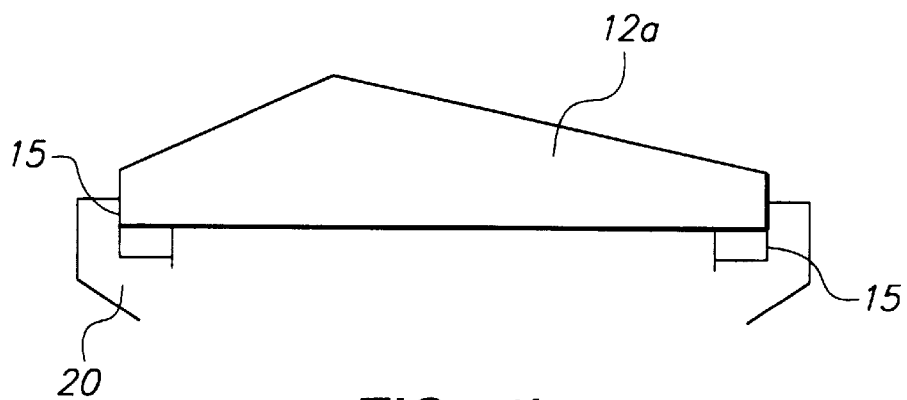

In the figures so far, cover 12 has been depicted as being planar—i.e., shaped like a flat plate or sheet. However, the invention is not restricted to such an embodiment, and cover 12 can be instead be an optical element such as a lens 12a (see partial view of the assembly shown in FIG. 4a) or a prism 12b (see partial view of the assembly shown in FIG. 4b). Such a design allows for a more compact display, in which the assembly is integrated with the display's optics. Illustrative compact displays for which the present invention is suitable include the ones disclosed in Hildebrand et al., U.S. Pat. No. 5,625,372 (1997) and U.S. Pat. No. 5,644,232 (1997) and Siliscape, WO 98/00747 (1998); the disclosures of which are incorporated herein by reference. Cover 12 may have a dark mask thereon, for eliminating reflections from electro-optically inactive areas of module 10 and to prevent stray light from hitting second substrate 30 (undesirable where it is a semiconductor).

Cover sealant 15, besides being a good adhesive for cover 12 and base 20, preferably has a moisture vapor transmission rate (MVTR) of less than 5 g/m$^2$/24 hr for a 0.635 mm (0.025 inch) thick film at 40° C. and 90% relative humidity (RH) and generates or transmits less than 5,000 psi shear stress to cover 12 during temperature cycling between −20 and +80° C. A specific example of a suitable cover sealant 15 is a UV curable epoxy adhesive, such as EMCAST 1738-LD-60 from Electronic Materials, Inc. This adhesive cures to a flexible state suitable for strain relief and has good adhesion to glass and aluminum. (In one test, there was no delamination between a metal base 20 and a glass cover 12 during −20 to +80° C. temperature cycling, nor was cracking of glass cover 12 observed.) Its MVTR is low, on the order of 4.75 g/m$^2$/24 hr for a 0.635 mm (0.025 inch) thick film at 40° C. and 90% relative humidity (RH).

The lateral sealant for lateral seal 14b can but need not be the same as cover sealant 15, as the substrates being bonded by each sealant are not necessarily the same. It may be desirable to adapt each sealant to its particular adherends. Generally, it is preferred that the sealant for lateral seal 14b have good adhesion to metals and plastics, have a low cure temperature (approximately 90° C. or lower) and a short cure time (approximaterly 4 hr or less), and have an MVTR less than 5 g/m$^2$/24 hr for a 0.635 mm (0.025 inch) thick film at 40° C. and 90% RH. An example of a suitable material is DP-190 Gray sealant from Minn. Mining & Manufacturing Co.

Edge sealant 23, besides having good adhesion to glass, ITO, and chip passivation films such as silicon nitride and silicon dioxide, preferably has a MVTR of less than 5 g/m$^2$/24 hr for a 0.635 mm (0.025 inch) thick film at 40° C. and 90% RH and generates or transmits less than 5,000 psi shear stress to the first and second substrates during temperature cycling between −20 and +80° C., and does not, in its unset condition, damage the liquid crystal material after 1 min contact at 40° C. One type of a suitable edge sealant is a UV curable adhesive, a specific example being 30Y-296-3 from ThreeBond. In its uncured form, it did not damage encapsulated liquid crystal material after contact therewith for a period of 1 min at 40° C. (some adhesives damage the liquid crystal material during the short interval between application and cure). Its MVTR is relatively low, 2.4 g/m$^2$/24 hr for a 0.635 mm (0.025 inch) thick film at 40° C. and 90% RH (low MVTR of the primary seal material places a less demand on the quality of the secondary seal).

Preferably index matched adhesive 9, besides having good adhesion to cover 12 and first substrate 25, has a refractive index of 1.54±0.02 at 540 nm (where cover 12 and first substrate are both made of glass, refractive index about 1.56) and has an elastic modulus of less than 2,000 psi. Index matched adhesive 9 preferably is a UV curable adhesive, such as Norland Optical Adhesive 73. It has a balanced viscosity for bubble-free application and is UV curable through a glass cover 12 with a relatively low irradiation level (4 Joules/cm$^2$). Its low elastic modulus (approximately 1,600 psi) minimizes stress transmission from cover 12 to first substrate 25 of module 10 and reduces stress build-up due to adhesive shrinkage during the UV cure cycle. Its refractive index (n=1.56) matches well that of glass (n=1.54), a common material for cover 12 and/or first substrate 25.

In addition to good sealing, the assembly of this invention allows for effective heat dissipation because second substrate 30 makes good thermal contact with thermally conductive material 19, enabling the efficient conduction of heat away from module 10. Base 20 itself is preferably made of a thermally conductive material having a thermal conductivity greater than 50 watt/m−° K, for example a metal such as aluminum (about 250 watt/m−° K) or a thermally conductive composite, and optionally may be mounted on or bonded to additional heat sink hardware. Because of the intervening thermally conductive material 19, any mechanical stresses which may develop in base 20 are not transmitted to module 10 or liquid crystal material 35.

Thermally conductive material 19 is preferably a gel, such as one based on silicone (also known as polysiloxane or organopolysiloxane), polyurethane, polyurea, an anhydride-containing polymer, styrene-ethylene butylene-styrene (SEBS) block polymer, or styrene-ethylene propylene-styrene (SEPS) block copolymer.

Preferably, the gel is a silicone gel based on polydimethylsiloxane (PDMS) and prepared by the platinum-catalyzed reaction between a vinyl-functionalized PDMS and a hydride-functionalized PDMS. Such gels can be formed in a number of ways. One method synthesizes the crosslinked polymer in the presence of a non-reactive extender fluid, e.g. trimethylsiloxy-terminated PDMS. An alternative method fabricates the silicone gel by reacting a stoichiometric excess of a multifunctional vinyl-substituted silicone with a multifunctional hydride-substituted silicone in such a fashion that a soft, fluid-extended system is obtained. In the latter approach, a vinyl-rich sol fraction is obtained. Of course, combination systems are possible. Suitable examples of either of these gel systems are taught in, inter alia, Debbault, U.S. Pat. No. 4,600,261 (1986); Debbault, U.S. Pat. No. 4,634,207 (1987); Debbault, U.S. Pat. No. 5,357,057 (1994); Dubrow et al., U.S. Pat. No. 5,079,300 (1992); Dubrow et al., U.S. Pat. No. 4,777,063 (1988); and Nelson, U.S. Pat. No. 3,020,260 (1962); all incorporated herein by reference. Silicone gel systems based on alternative cure techniques such as peroxide, UV light, and high energy radiation may also be used.

Especially preferred are soft, tough, tacky, high elongation silicone gels that exhibit good stress relaxation and reduced fluid exudation. In an electronic application such as the present one, the exudation of extender fluid from the gel material (also referred to as fluid migration or bleed-out) is undesirable because it contaminates the surrounding environment with a thin liquid film.

A preferred low-exudation silicone gel can fabricated by the chain extension of a divinyl silicone material in the presence of a cross-linker and a chain extender to create a high molecular weight sol, such that the weight average molecular weight ($M_w$) of the extractable fluid is at least 100,000 g/mol. (The extractable fluid consists of the sol and nonreactive diluent present in the formulation, if any.) The gel material is preferably fabricated with 0 to 40 weight % added inert extender diluent. An alternative synthetic method is to use a diluent with $M_w$ of at least 100,000 g/mol, but then the initial (uncured) viscosity is greater than 50,000 cP, which may make filling the base more difficult. Generally, these silicone gels preferably have a hardness of 10 to 1,000 g (more preferably 10 to 500 g), a tack of 5 to 250 g (a tackier gel leading to better thermal contact), an ultimate elongation of greater than 500%, a stress relaxation 20 to 95%, and a toughness of greater than 10 in-lb/in$^3$. These properties enable the gel material to be highly deformable to accommodate the liquid crystal display module and maintain good thermal contact without imparting undesirable mechanical stress thereto.

The gel material may be rendered thermally conductive by the inclusion of an electrically non-conductive, thermally conductive particulate filler such as aluminum oxide (alumina), silicon carbide, zinc oxide, aluminum nitride, ferric oxide, beryllium oxide, titanium dioxide, magnesium oxide, boron nitride, and the like. The filler should have a thermal conductivity of at least 1 watt/m-° K, preferably at least 10 watts/m-° K. A preferred filler is aluminum oxide. Illustrative disclosures relating to the preparation of thermally conductive gel materials include Dittmer et al., U.S. Pat. No. 4,852,646 (1989), and Raychem, WO 96/05602 (1996); the disclosures of which are incorporated herein by reference. The amount of the filler is widely variable, but should be in an amount sufficient to impart to the gel material a thermal conductivity of at least 0.5 watt/m-° K, more preferably at least 1.0 watt/m-° K. Generally, the filler will be present in an amount of between about 5 and about 70 weight %, based on the combined amounts of gel material and filler. A softer gel will place less stress on module 10 while a more highly filled gel will be harder and have higher thermal conductivity, so that some balancing between mechanical and thermal conductivity requirements may be in order.

The material for cover sealant 15 preferably has properties minimizing the amount of moisture reaching liquid crystal material 35, namely, a moisture vapor transmission rate (MVTR) of less than 5 g/m$^2$/24 hr for a film 0.025 inch (ca. 0.64 mm) thick and thermo-mechanical properties satisfying inequality (1):

$$\left| \int_{T_{set}}^{T} \frac{\alpha_s - \alpha_c}{1/E_s - 1/E_c} dT \right| \leq \frac{E*(\text{cover})}{\mu} \tag{1}$$

where $T_{set}$ is the setting temperature of the cover sealant; T is the test temperature (between −20 and +80° C.); $\alpha_s$ is the cover sealant's coefficient of thermal expansion; $\alpha_c$ is the cover's coefficient of thermal expansion; $E_s$ is the sealant's modulus of elasticity; $E_c$ is the cover's modulus of elasticity; E*(cover) is the cover's breakage stress; and $\mu$ is an engineering safety factor.

Where the cover is made of a glass such as Corning 1737F glass, $\alpha_c$ is 3.78×10$^{-6}$ m/m/° K and $E_c$ is 10.5×10$^6$ psi. E*(cover)/$\mu$ is estimated to be about 5,000 psi in tension (Tummala et al., eds., "Microelectronics Packing Handbook, Part II," p. II-372 (Chapman and Hall, 1997). It is expected that $E_s << E_c$, in which case Equation (1) can be simplified to:

$$|f(\alpha_s - 3.78 \cdot 10^{-6})E_s dT| \leq 5000 \tag{2}$$

If the cover sealant has a glass transition temperature greater than 80° C., Equation (2) can be approximated by:

$$|(\alpha_s - 3.78 \cdot 10^{-6})E_s(T - T_{set})| \leq 5000 \tag{3}$$

A cover sealant selected according to the above guidelines reduces the amount of moisture reaching module 10 and liquid crystal material 35, but without causing cover 12 to break during temperature cycling.

Second substrate 30 preferably is a silicon wafer on which the active matrix elements have been formed using standard semiconductor fabrication techniques, for example a MOS chip. The surface of the wafer is polished smooth to provide a reflective surface for reflecting light passing through liquid crystal material 35. However, the present invention is not limited to silicon wafers and may be used for other active matrix systems, for example thin film transistors (TFT's) on glass or active matrix elements such as diodes, varistors, or MIM's carried on other types of substrates.

One type of liquid crystal display for which the present invention is especially suitable employs a liquid crystal composite comprising plural volumes (or droplets) of liquid crystals contained (i.e., dispersed, encapsulated, or embedded) within a polymer matrix. Such composites have been referred to in the art alternatively as encapsulated liquid crystal material, nematic curvilinear aligned nematic (NCAP) materials or as polymer dispersed liquid crystal (PDLC) materials. Exemplary disclosures include Fergason, U.S. Pat. No. 4,435,047 (1984); West et al., U.S. Pat. No. 4,685,771 (1987); Pearlman, U.S. Pat. No. 4,992,201 (1991); Andrews et al., U.S. Pat. No. 5,202,063 (1993); Kamath et al., U.S. Pat. No. 5,233,445 (1993); Reamey, U.S. Pat. No. 5,328,850 (1994); Reamey et al., U.S. Pat. No. 5,405,551 (1995); Wartenberg et al., U.S. Pat. No. 5,427,713 (1995); Raychem WO 95/25777 (1995); Reamey et al., U.S. Pat. No. 5,543,944 (1996); Raychem WO 96/19547 (1996); Raychem, WO 96/20986 (1996); and Dainippon Ink, EP 0,313,053 (1989); the disclosures of which are incorporated herein by reference. Generally, such composites are light scattering and/or absorbing in the absence of a sufficient electric field (the field-off state), but are substantially light transmissive in the presence of such electric field (the field-on state). The present invention is particularly advantageous with NCAP/PDLC materials, as their electrooptical properties are susceptible to even fairly low stress levels.

Other types of liquid crystal displays can also be used with the present invention, for example displays of the twisted-nematic (TN) design and variants thereof, such as super-twist designs.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. An assembly comprising:
   (a) a base having a cavity and a lateral opening;
   (b) a liquid crystal display module, including
      (i) first and second substrates oriented in a generally face-to-face relationship, wherein the first substrate is transparent and has on its interior face a transparent electrode material and wherein the second substrate has on its interior face a plurality of active matrix elements;
      (ii) liquid crystal material sandwiched between the first and second substrates; and
      (iii) an edge sealant forming a seal around the edges of the liquid crystal display module;
   (c) a transparent cover;
   (d) a cover sealant bonding the transparent cover to the base such that the cover covers the cavity and a seal is formed between the cover and the base;
   (e) an adhesive bonding the first substrate of the liquid crystal module to the transparent cover, such that the liquid crystal display module is suspended in the cavity but is spaced apart from direct physical contact with the base;
   (f) a thermally conductive material thermally connecting the liquid crystal display module and the base;
   (g) external connect circuitry connected to and extending from the the liquid crystal display module and exiting the base through the lateral opening; and
   (h) an insert fitting into and sealing the lateral opening while permitting the external connect circuitry to exit therethrough.

2. An assembly according to claim 1, wherein the liquid crystal material in the liquid crystal display module comprises a liquid crystal material composite in which plural volumes of liquid crystal material are contained in a polymer matrix.

3. An assembly according to claim 1, wherein the second substrate is a silicon wafer.

4. An assembly according to claim 3, wherein the liquid crystal material in the liquid crystal display module comprises a liquid crystal composite in which plural volumes of liquid crystals are contained in a polymer matrix.

5. An assembly according to claim 1, wherein the cover sealant has a moisture vapor transmission rate of less than 5 g/m$^2$/24 hr for a 0.635 mm thick film at 40° C. and 90% relative humidity and generates or transmits less than 5,000 psi shear stress on or to the transparent cover during temperature cycling between −20 and +80° C.

6. An assembly according to claim 1, wherein the edge sealant has a moisture vapor transmission rate of less than 5 g/m$^2$/24 hr for a 0.635 mm thick film at 40° C. and 90% relative humidity, generates or transmits less than 5,000 psi shear stress to the first and second substrates during temperature cycling between −20 and +80° C., and does not, in its unset condition, damage the liquid crystal material after 1 min contact therewith at 40° C.

7. An assembly according to claim 1, wherein the insert and the base are made of the same material.

8. An assembly according to claim 1, wherein the insert comprises an elastomeric material.

9. An assembly according to claim 1, wherein the base comprises a material having a thermal conductivity of greater than 50 watt/m−° K.

10. An assembly according to claim 1, wherein the base comprises aluminum.

11. An assembly according to claim 1, wherein the thermally conductive material is a silicone gel having a thermal conductivity of at least about 1.0 watt/m−° K.

12. An assembly according to claim 11, wherein the silicone gel is filled with aluminum oxide in an amount between 5 and 70 weight %, based on the combined weights of aluminum oxide and silicone.

13. An assembly according to claim 1, wherein the transparent cover and the first substrate both comprise glass and further wherein the adhesive has a refractive index of 1.54±0.02 at 540 nm and has an elastic modulus of less than 2,000 psi.

14. An assembly according to claim 1, further comprising a lateral sealant forming a seal among the external connect circuitry, the lateral opening of the base, and the insert.

15. An assembly according to claim 1, wherein the cover is planar.

16. An assembly according to claim 1, wherein the cover is a lens.

17. An assembly according to claim 1, wherein the cover is a prism.

* * * * *